(12) United States Patent
Miller, Jr. et al.

(10) Patent No.: US 12,461,990 B2
(45) Date of Patent: *Nov. 4, 2025

(54) MODEL-BASED DATA TRANSFORMATION

(71) Applicant: Teachers Insurance and Annuity Association of America, New York, NY (US)

(72) Inventors: Edward J. Miller, Jr., Iola, KS (US); Daniel R. Hursh, Dayton, OH (US); Alexis S. Pecoraro, Huntersville, NC (US); Pankaj Agrawal, Concord, NC (US); James G. Rauscher, Erie, CO (US); John V. Hintze, Charlotte, NC (US)

(73) Assignee: Teachers Insurance and Annuity Association of America, New York, NY (US)

( * ) Notice: Subject to any disclaimer, the term of this patent is extended or adjusted under 35 U.S.C. 154(b) by 709 days.

This patent is subject to a terminal disclaimer.

(21) Appl. No.: 17/846,632

(22) Filed: Jun. 22, 2022

(65) Prior Publication Data

US 2023/0010427 A1    Jan. 12, 2023

Related U.S. Application Data

(63) Continuation of application No. 16/701,988, filed on Dec. 3, 2019, now Pat. No. 11,416,720.

(51) Int. Cl.
*G06F 18/213* (2023.01)
*G06F 18/20* (2023.01)
*G06F 18/21* (2023.01)

(52) U.S. Cl.
CPC .......... *G06F 18/213* (2023.01); *G06F 18/217* (2023.01); *G06F 18/29* (2023.01)

(58) Field of Classification Search
CPC ....... G06F 18/213; G06F 18/217; G06F 18/29
See application file for complete search history.

(56) References Cited

U.S. PATENT DOCUMENTS

2008/0140705 A1    6/2008 Luo
2008/0263510 A1*   10/2008 Nerome ................. G06F 8/355
                                              717/104

(Continued)

OTHER PUBLICATIONS

Gomes et al, "A Framework for Efficient Model Transformations" (published as a Master's Thesis from the Universidade NOVA de Lisboa, Sep. 2013, retrieved at https://dialog.proquest.com/professional/docview/2956853445?accountid=131444).*

(Continued)

*Primary Examiner* — Casey L Kretzer
(74) *Attorney, Agent, or Firm* — Lowenstein Sandler LLP (57) ABSTRACT

Disclosed are methods and systems for model-based data transformation. An example method includes: receiving a source graph model describing a source data structure, wherein the source graph model comprises a source root node associated with a plurality of source section nodes, wherein each source section node of the plurality of source section nodes is associated with at least one source attribute node; receiving a target graph model describing a target data structure, wherein the target graph model comprises a target root node associated with a plurality of target section nodes, wherein each target section node of the plurality of target section nodes is associated with at least one target attribute node; receiving a transformation map associating a target attribute node of the target data structure with one or more source attribute nodes of the source data structure; extracting, from the source data structure, one or more source data items associated with the one or more source attribute nodes; generating, by applying a transformation specified by the transformation map to the one or more source data items, a (Continued)

target data item associated with the target attribute node; and storing the target data item in the target data structure.

17 Claims, 7 Drawing Sheets

(56) References Cited

U.S. PATENT DOCUMENTS

| | | | |
|---|---|---|---|
| 2013/0174129 A1* | 7/2013 | Grammel | G06F 16/212 |
| | | | 707/E17.069 |
| 2018/0068001 A1* | 3/2018 | Panwar | G06F 16/288 |
| 2019/0050445 A1 | 2/2019 | Griffith et al. | |
| 2020/0387553 A1 | 12/2020 | Tyulyaev et al. | |

OTHER PUBLICATIONS

Spark 2.0.0, "Spark Programming guide", https://spark.apache.org/docs/2.0.0/programming-guide.html, 21 pages.
Spark 2.4.5, "GraphX Programming Guide", https://spark.apache.org/docs/latest/graphx-programming-guide.html, 27 pages.
USPTO, Notice of Allowance for U.S. Appl. No. 16/701,988, mailed on Apr. 6, 2022.

* cited by examiner

| | A | B | C | D | E | F | G | H | I | J | K | L |
|---|---|---|---|---|---|---|---|---|---|---|---|---|
| 1 | Rec | Plan | SSN | Location | Last Name | First Name | Payroll Date | Source 1 | Amount 1 | Source 2 | Amount 2 | |
| 2 | D | 100100 | 111111111 | LOC1 | Smith | Joe H | 11/23/2018 | A | 156.85 | D | 156.85 | |
| 3 | D | 100100 | 111111112 | LOC2 | Jones | Kate L | 11/23/2018 | A | 50 | D | 25 | |
| 4 | D | 100101 | 111111112 | LOC3 | Jones | Kate L | 11/23/2018 | A | 110 | D | 55 | |
| 5 | D | 100101 | 111111113 | | Dillon | Jim | 11/23/2018 | A | 250 | D | 125 | |
| 6 | D | 100101 | 111111114 | LOC4 | West | Fred | 11/23/2018 | A | 200 | D | 100 | |
| 7 | | | | | | | | | | | | |

MODEL-BASED DATA TRANSFORMATION

RELATED APPLICATIONS

This application is a continuation of U.S. patent application Ser. No. 16/701,988 filed on Dec. 3, 2019, which is incorporated by reference herein.

TECHNICAL FIELD

The present disclosure is generally related to distributed computer systems, and is more specifically related to methods and systems of performing model-based data transformation.

BACKGROUND

A financial institution may exchange data with its existing and/or potential clients, including institutional clients, e.g., for performing client enrollment, onboarding, reporting, as well as various financial account management operations and/or financial transactions.

Examples of financial institutions include, but are not limited to, banks, building societies, credit unions, trust companies, mortgage loan companies, insurance companies, investment banks, underwriters, brokerage firms, etc. Examples of financial accounts include, but are not limited to, checking accounts, savings accounts, loan accounts, revolving credit accounts, investment accounts, brokerage accounts, retirement accounts, annuity accounts, etc.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 6 depicts a flow diagram of an example method 600 of performing model-based data transformation, in accordance with one or more aspects of the present disclosure.

FIG. 7 illustrates a diagrammatic representation of a computer system 700 that may be employed for implementing the methods described herein.

DETAILED DESCRIPTION

Described herein are methods and systems of model-based data transformation.

Various business processes may involve batch and/or interactive data import operations. For example, a financial institution may implement a batch process and/or an interactive process for customer enrollment or onboarding process, which may involve extracting the necessary information from one or more third-party data structures (e.g., employee information files generated by the employer). "Data structure" herein shell be interpreted as a data file, a memory data structure, or a data stream.

However, the layouts, field nomenclature, field formatting and/or encoding rules of the third-party owned source data structures utilized in batch and/or interactive data import operations may be different from the layouts, field nomenclature, field formatting and/or encoding rules of the target data structures that are utilized by the financial institution, thus necessitating various data transformation operations to be performed on the data extracted from the source data structures.

Systems and methods of the present disclosure employ graph models representing the source and target data structures for specifying the data transformations to be performed by batch data import operations. In an illustrative example, a pair of the graph models representing the source and target data structures may be utilized for specifying the data transformations that need to be performed in order to populate the target data structure by the data extracted from the source data structure. Nodes of a graph model represent data types, data objects that include multiple data items, or individual data items; edges of the graph model represent relationships between the data elements represented by nodes. In particular, terminal nodes of a graph model (also referred to as "attribute nodes" herein) represent data items of the type specified by higher level nodes (also referred to as "section nodes" herein), which are ultimately grouped into groupings specified by the upper level nodes (also referred to as "root nodes" herein).

Data transformation operations that need to be performed on the data extracted from the source data structure in order to populate the target data structure may be specified by a transformation map that associates, directly or via a transformation node, each attribute node of the target data structure with one or more nodes of the source data structure. A computer system implementing the model-based data transformation methods described herein may iterate over the attributes of the target data structure, and for every attribute node may identify either a corresponding directly mapped attribute of the source data structure or a transformation node associating the target attribute node with one or more source attribute nodes. Then the computer system may extract the values of the identified one or more source attributes and either directly copy the extracted source attribute value to the target attribute or perform the identified transformation on the extracted source attribute values and store the transformation result to the target attribute, as described in more detail herein below. The methods described herein may be implemented in the batch and/or interactive mode.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
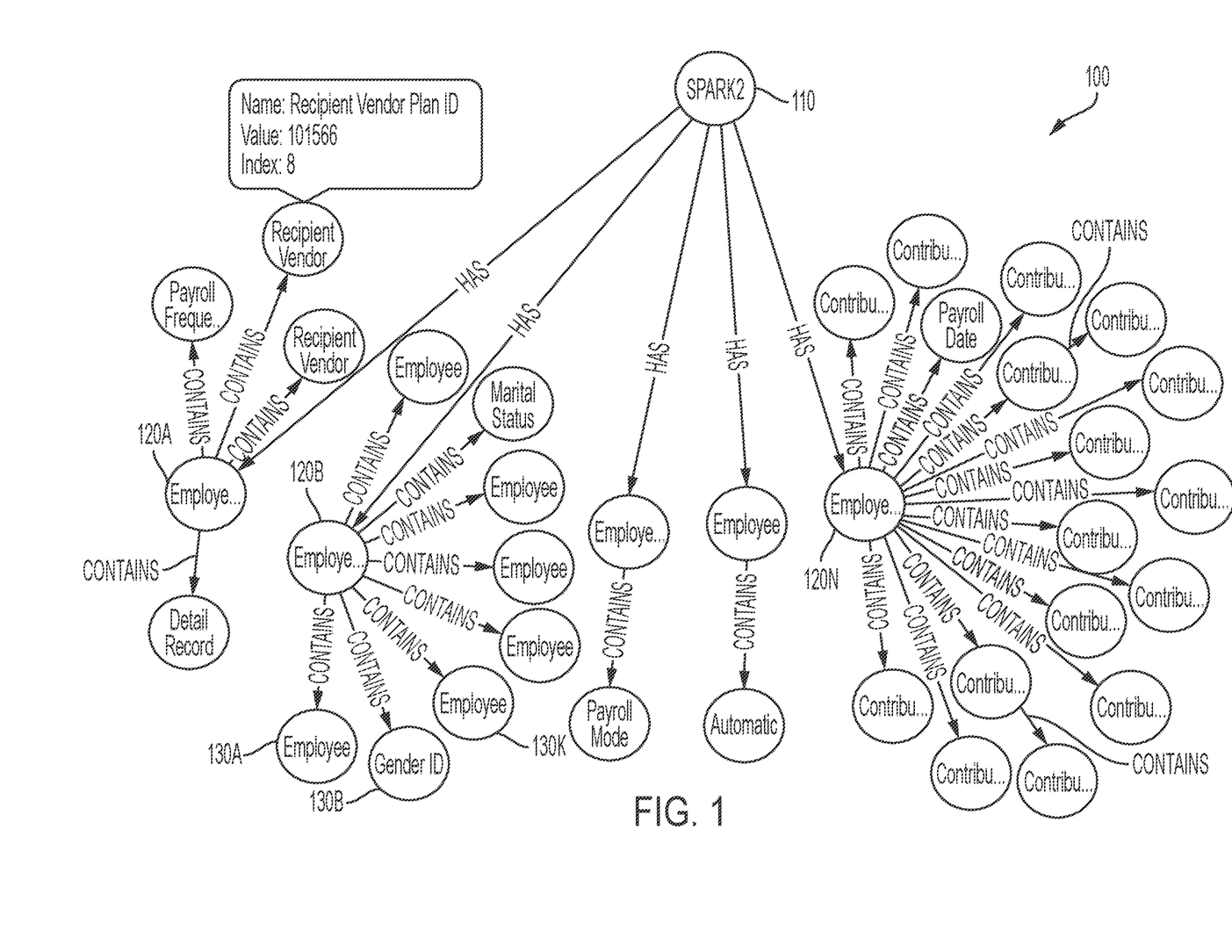
FIG. 1 schematically illustrates a graph model representing a source or a target data structure, implemented in accordance with one or more aspects of the present disclosure.

FIG. 1 schematically illustrates a graph model representing a source or a target data structure, implemented in accordance with one or more aspects of the present disclosure. As shown in FIG. 1, the graph model 100 may comprise a root node 110 and a plurality of section nodes 120A-120N, such that each section node 120 is associated with the root node 110 by a relationship depicted by an arrow. Nodes of the graph model 100 represent data types, data objects that include multiple data items, or individual data items; edges of the graph model 100 represent relationships between the data elements represented by the nodes. Each edge is characterized by a relationship type, which may be represented by a transitive verb, such that one of the pair of nodes associated by the edge represents a subject, the relationship type represents a predicate associated with the subject, and the other node of the pair of nodes represents an object associated with the predicate.

Each section node 120 may be associated, by edges representing relationships of specified types, with one or more attribute nodes 130A-130K. Each attribute node 130 may have name, value, and index properties. The name property may be represented by an arbitrary alphanumeric string. The value property may be represented by a Boolean value, a number, or an alphanumeric string. The index property may specify the location (e.g., the index or the start and end positions) of the corresponding value in the data structure described by the graph model.

Figure 2:
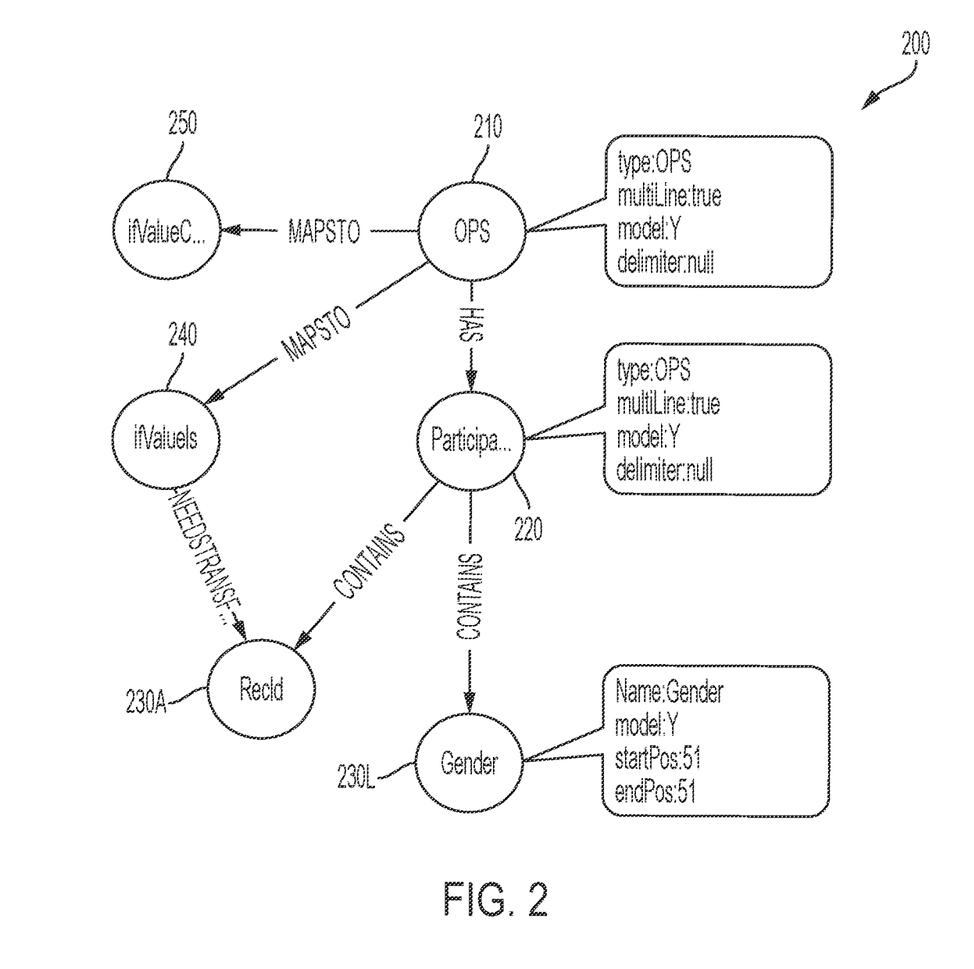
FIG. 2 schematically illustrates a fragment of an example graph model implemented in accordance with one or more aspects of the present disclosure.

As noted herein above, both the source and the target data structure may be described by respective graph models. In order to specify the transformations to be performed on the source data structure for producing the target data structure, the graph model may include nodes of the following types: a root node associated with one or more section nodes, each of which is in turn associated with one or more attribute nodes, as schematically illustrated by FIG. 2.

The root node 210 representing a data object of a specified type has one or more properties that describe the source data structure and specify certain aspects of processing the source data structure. In particular, the multiline property of the Boolean type has the value of "true" if the data object is described by multiple lines of the source data structure and the value of "false" if the data object is described by a single line of the source data structure. The model property of the Boolean type has the value of "true" if the graph model defines the source data structure and the value of "false" otherwise. The Delimiter property has the value of the character that is utilized for delimiting the data fields. The value of "null" indicates that the source data structure has fixed length data fields and thus does not utilize any delimiters.

One or more section nodes 220 act as attribute containers. If the source data structure is multiline, each section node holds the attributes associated with a single line of the source data structure and the corresponding Record Type property specifies the type of the record represented by the section node. The Name property, which may be the same for multiple section nodes, acts as the name space for the attributes associated with the section node.

One or more attribute nodes 230A-230L represent data items of the section. An attribute node 230 may have name, value, and index properties. The name property may be represented by an arbitrary alphanumeric string. The value property may be represented by a Boolean value, a number, or an alphanumeric string. The index property may specify the location (e.g., the index or the start and end positions) of the corresponding value in the data structure described by the graph model. An attribute node 230 may also have optional data type and format attributes.

The graph model may also include special nodes representing instance transformation. These nodes, ifValueIs 240 and ifValueChanges 250, determine when a new instance of the data object represented by the root node 210 needs to be created in the process of parsing multiline source data structures. In particular, an attribute node 230A specifies the record type of the record represented by the corresponding section node 220. Certain reserved values of the record type may be utilized, in association with ifValueIs node 240, for specifying when a new instance of the data object represented by the root node 210 needs to be created. Conversely, ifValueChanges 250, in association with an attribute node 230, may be utilized to indicate that a new instance of the data object represented by the root node 210 needs to be created when the value of the attribute node 230 changes.

As noted herein above, a pair of the graph models representing the source and target data structures may be utilized for specifying data transformations that need to be performed in order to populate the target data structure by the data extracted from the source data structure. The data transformations may be specified by a graph model that includes the source graph model representing the source data structure, the target graph model representing the target data structure, and the attribute mappings, such that each attribute node of the target data structure is associated, directly or via a transformation node, with one or more nodes of the source data structure.

Figure 3:
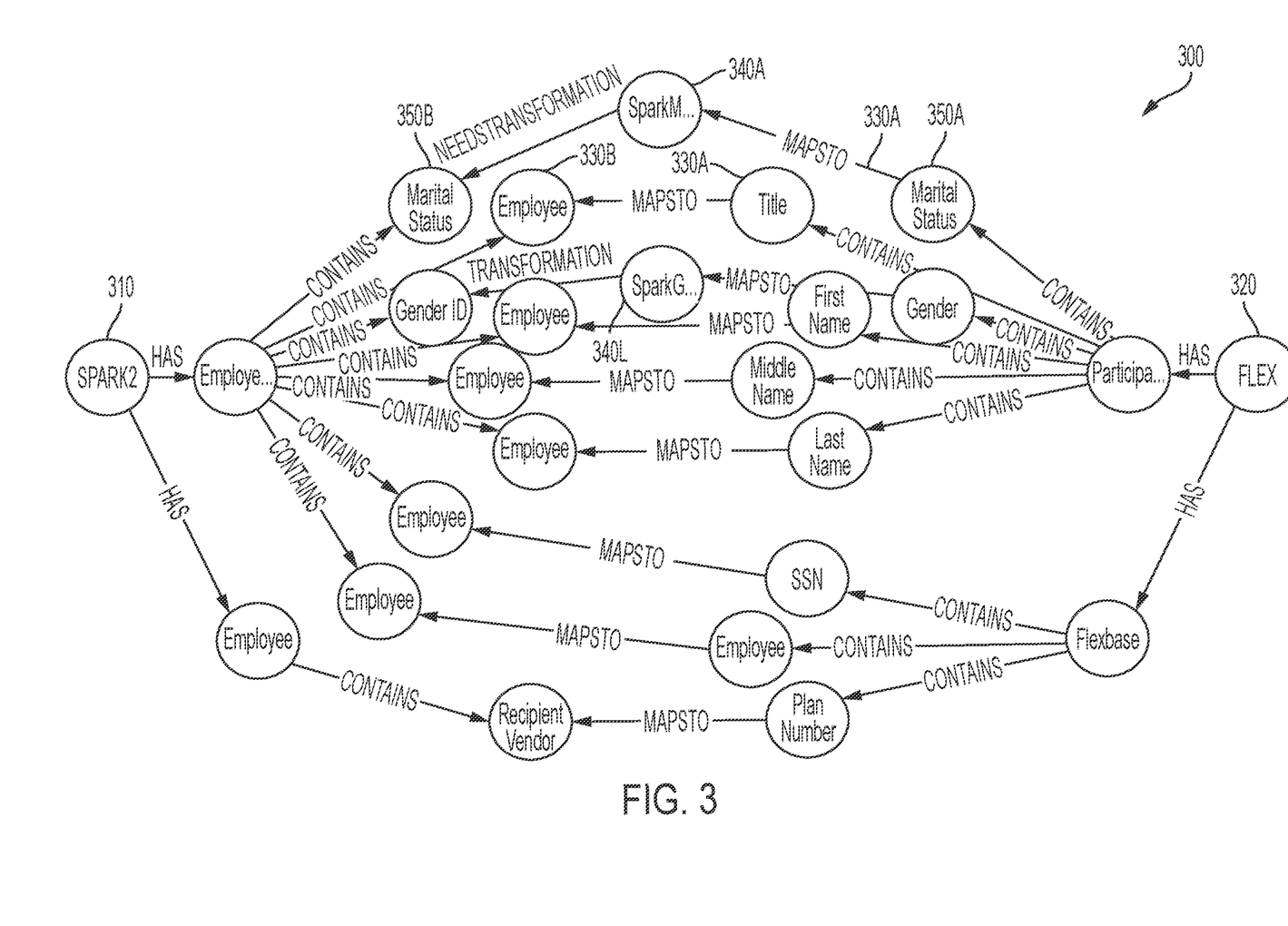
FIG. 3 schematically illustrates an example transformation map associating a target graph model and a source graph model, implemented in accordance with one or more aspects of the present disclosure.

FIG. 3 schematically illustrates an example transformation map associating a target graph model and a source graph model, implemented in accordance with one or more aspects of the present disclosure. The example transformation map 300 specifies a mapping between attributes of the source data structure that defines the type SPARK2 represented by the source root node 310 and attributes of the target data structure that defines the type FLEX represented by the target route node 320.

As shown in FIG. 3, some target attributes may be directly mapped to corresponding source attributes. Therefore, the source attribute value may be extracted from the source data structure and may be directly (i.e., without any transformations) copied to the target data structure field specified by the mapping. For example, the "Title" attribute 330A of the target data structure is directly mapped to the "Employee title" attribute 330B of the source data structure, and thus the value of the "Employee Title" attribute 330B may be extracted from the source data structure and directly (i.e., without any transformations) copied to the "Title" attribute 330A of the target data structure.

Conversely, the remaining target attributes may be mapped to corresponding source attributes via respective transformation nodes 340A-340L. Therefore, the source attribute value may be extracted from the source data structure and processed by the transformation specified by the corresponding transformation node 340, the result of which may be stored to the target data structure field specified by the mapping. For example, the source data structure and the target data structure may utilize different encodings for the employee's marital status. Accordingly, the "Marital status" attribute 350A of the target data structure is mapped to the "Marital status" attribute 350B of the source data structure via a transformation node 340A, which specifies the transformation for translating the source encoding to the target encoding. Accordingly, the value of the "Marital status" attribute 350B may be extracted from the source data structure and processed by the transformation specified by the transformation node 340A. The result of the transformation may then be stored to the "Marital status" attribute 350A of the target data structure.

In certain implementations, a transformation specified by a transformation node 340 may be represented by executable scripts. Alternatively, a transformation specified by a transformation node 340 may be represented by a mapping data structure that includes a plurality of mappings, such that each mapping specifies a source value and a corresponding target value. The mapping data structure may be indexed by the source values, thus improving the efficiency of data retrieval.

In certain implementations, the mapping data structure 300 may be traversed in either direction. For example, a computer system implementing the model-based data transformation methods described herein may iterate over the attributes of the target data structure, and for every attribute may identify either a corresponding directly mapped attribute of the source data structure or a transformation node associating the target attribute with one or more source attributes. Then the computer system may extract the values of the identified one or more source attributes and either directly copy the extracted source attribute value to the target attribute or perform the identified transformation on the extracted one or more source attribute values and store the transformation result to the target attribute.

In another example, the computer system implementing the model-based data transformation methods described herein may iterate over the the attributes of the source data structure and for every attribute may identify either a corresponding directly mapped attribute of the target data structure or a transformation node associating the source attribute with a target attribute. Then the computer system may extract the values of the source attribute and either copy the extracted source attribute value to the directly linked target attribute or perform the identified transformation on the extracted source attribute value and store the transformation result to the identified target attribute.

In yet another example, the computer system implementing the model-based data transformation methods described herein may traverse the mapping graph in order to identify one or more source attributes associated with a target attribute that has an invalid value (e.g., a value having invalid encoding, a value falling out of a corresponding permissible value range, or an empty value of a mandatory attribute). In certain implementations, responsive to detecting an invalid value of a target attribute, the computer system may identify one or more source attributes associated with the target attribute by a direct mapping or a transformation, and may generate a notification identifying the identified source attributes.

Figure 4:
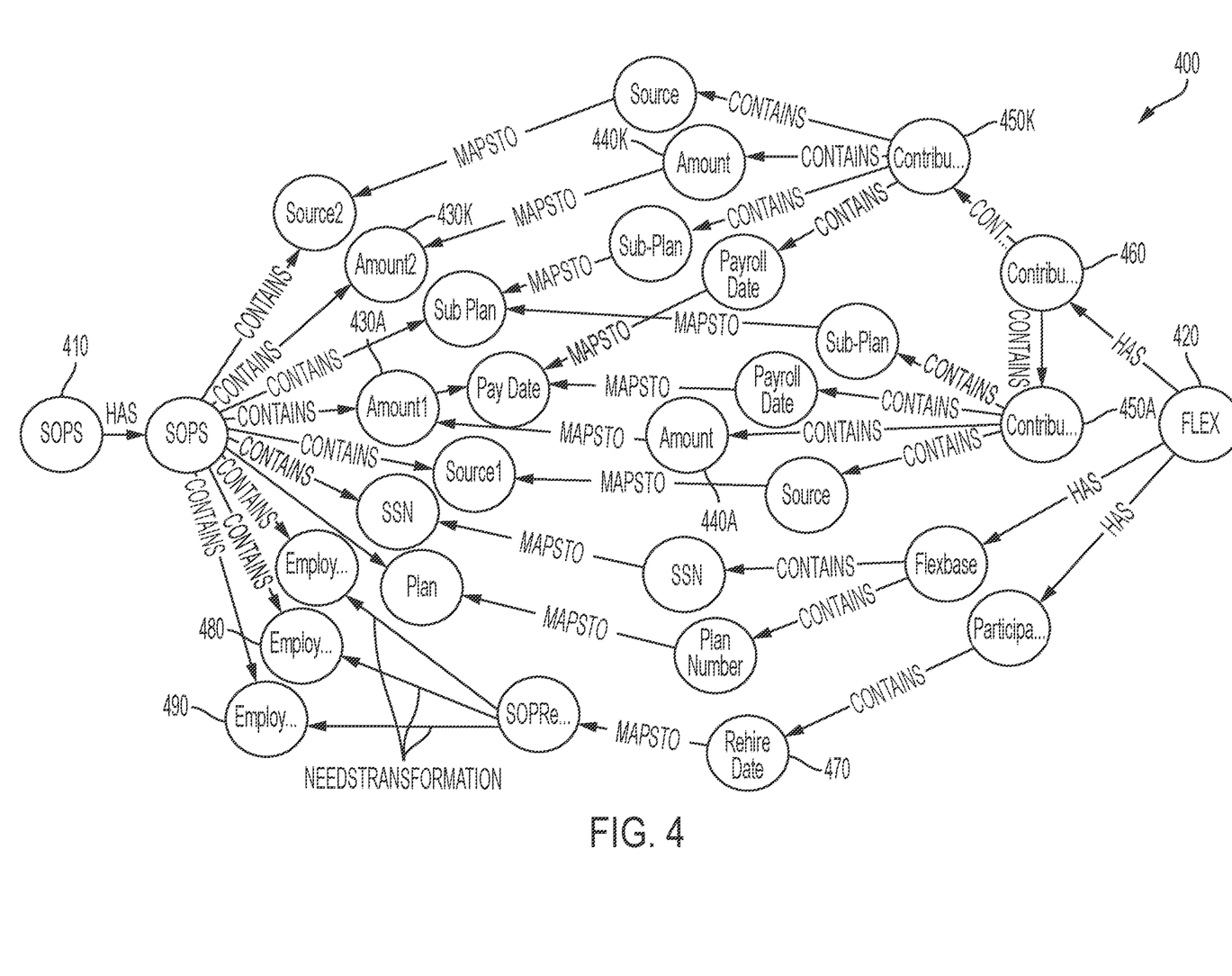
FIG. 4 schematically illustrates another example transformation map associating a target graph model and a source graph model, implemented in accordance with one or more aspects of the present disclosure.

FIG. 4 schematically illustrates another example transformation map associating a target graph model and a source graph model, implemented in accordance with one or more aspects of the present disclosure. The example transformation map 400 specifies a mapping between attributes of the source data structure that defines the type SOPS represented by the source root node 410 and attributes of the target data structure that defines the type FLEX represented by the target route node 420.

In certain implementations, section nodes of the same type may be grouped together in a list, individual entries of which are represented by numbered section nodes. As shown in FIG. 4, the source data structure includes a fixed number of Amount attributes 430A-430K, which are mapped to Amount attributes 440A-440K of the target data structure.

Each of the target Amount attributes 440A-440K is associated with a respective section nodes of 450A-450K of the type Contribution. The section nodes 450A-450K are grouped in the list 460 of the type ContributionList, individual entries of which are represented by numbered section nodes.

While a target attribute may only be directly mapped to a single source attribute, a transformation node may associate a target attribute with one or more source attributes. For example, the target data structure may have a Rehired Date attribute 470, which may be missing from the source data structure. However, the source data structure may have a Status attribute 480 and a corresponding Status Update Date attribute 490, the combination of values of which may be utilized for determining the value of the "rehired date" attribute 470: if the value of the source "status" attribute 480 is "rehired," then the value of the source "status update date" attribute 490 represents the value of the target "rehired date" attribute 470.

Figure 5A:
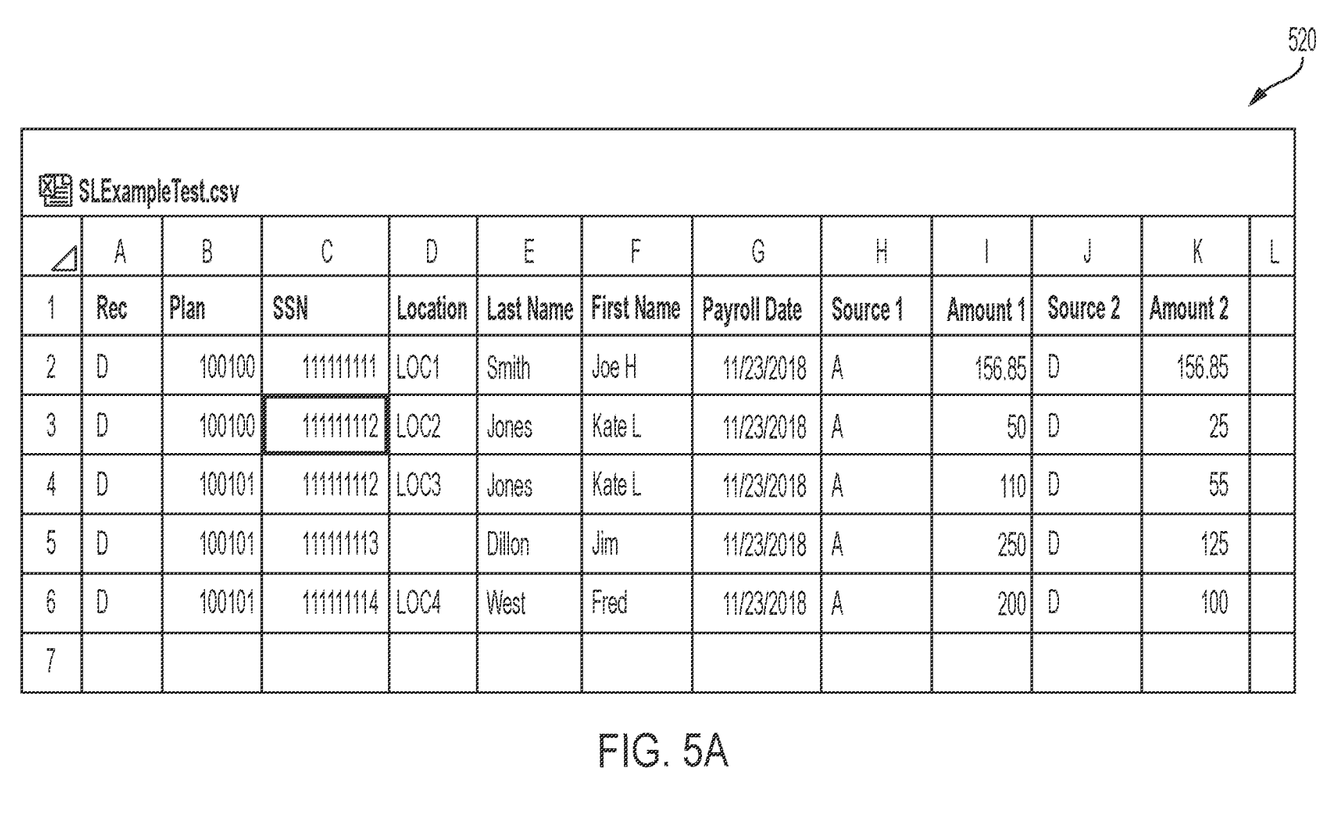
FIG. 5A schematically illustrates an example source data structure.
Figure 5B:
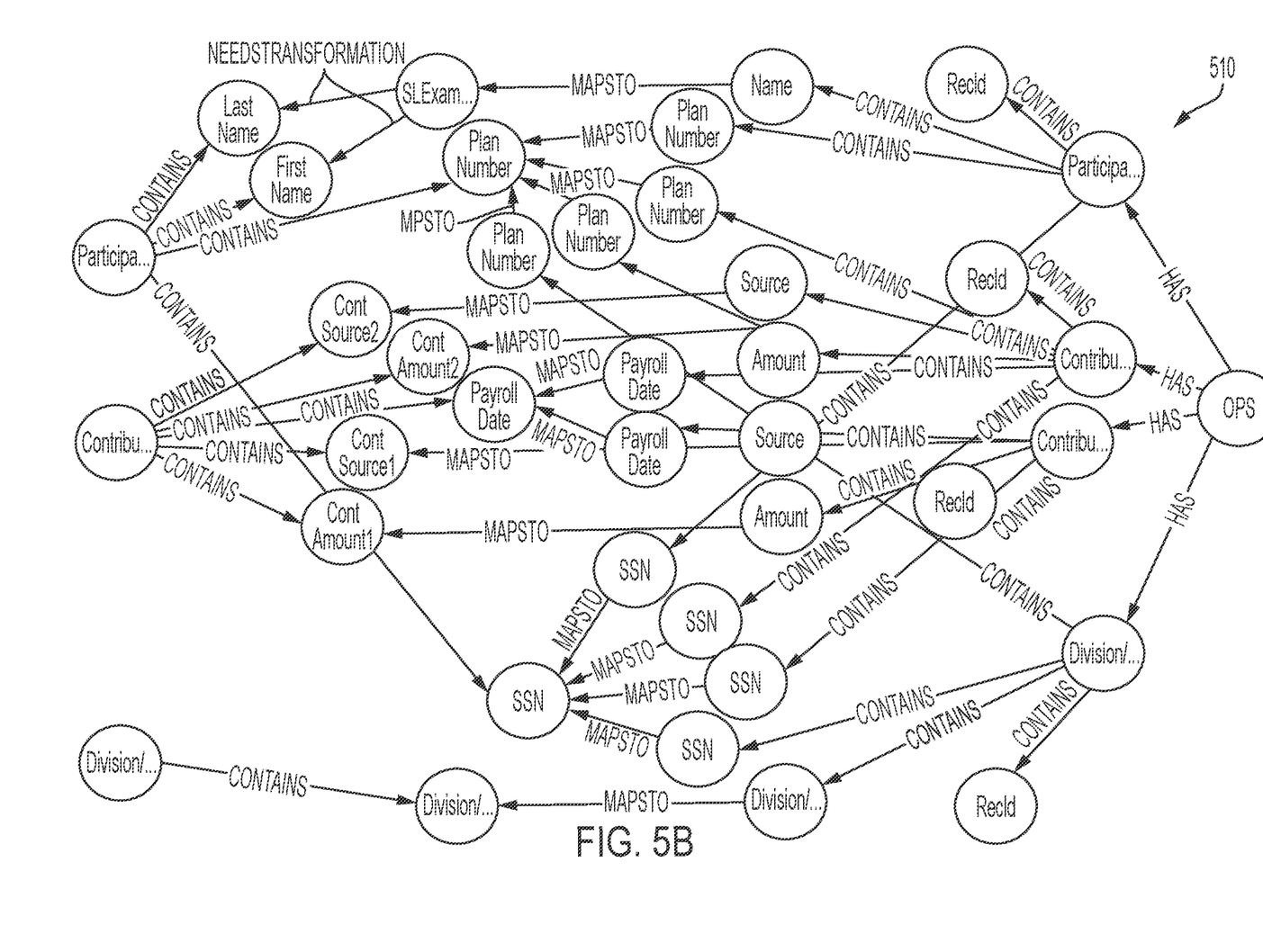
FIG. 5B schematically illustrates an example transformation map.
Figure 5C:
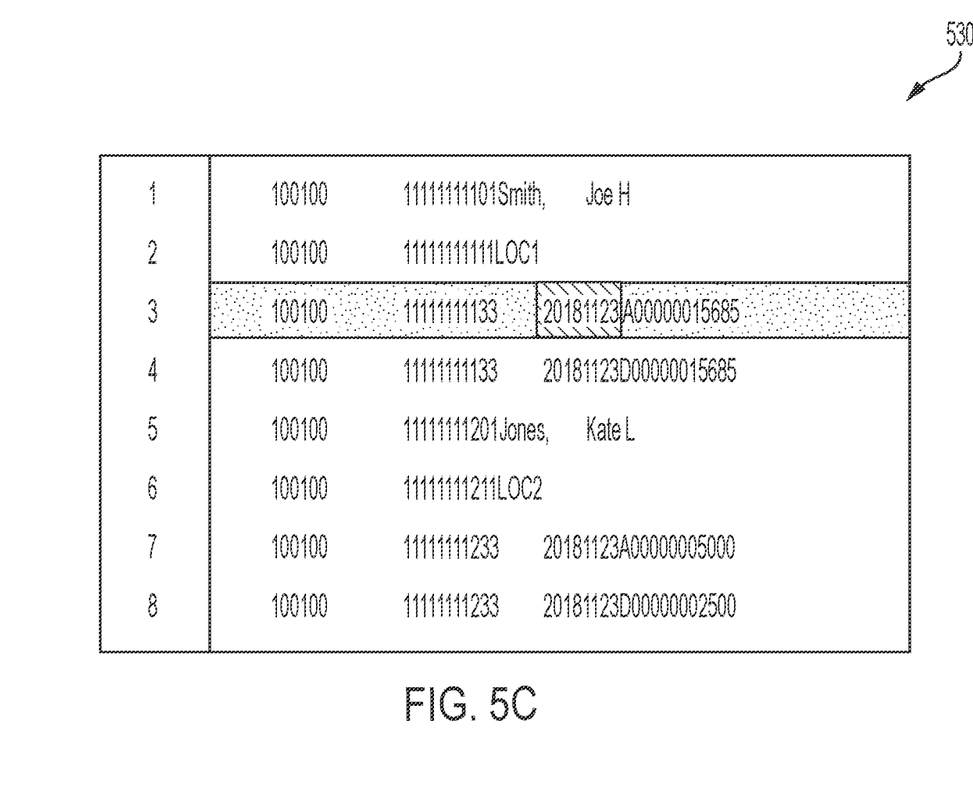
FIG. 5C schematically illustrates an example destination data structure produced by parsing the example source data structure based on the example transformation map by a computer system implementing the model-based data transformation methods described herein.

FIGS. 5A-5C schematically illustrate an example destination data structure produced by parsing an example source data structure based on an example transformation map by a computer system implementing the model-based data transformation methods described herein. As shown in FIG. 5B, the example transformation map 510 may specify the data transformations that need to be performed in order to parse the example source data structure represented by the spreadsheet 520 of FIG. 5A and generate the example target data structure represented by the target data structure 530 of FIG. 5C. It should be noted that in the example of FIGS. 5A-5C, the target data structure 530 includes multiple multiline records, each of which is produced by extracting the data from a single line of the spreadsheet 520. As noted herein above, in a multiline target data structure, each section node holds a plurality of attributes associated with a single line of the source data structure.

In other examples, the data transformation methods described herein may be applied to a single line source data structure and a single line target data structure, a single line source data structure and a multiline target data structure, or a multiline source data structure and a multiline target data structure.

FIG. 6 depicts a flow diagram of an example method 600 of performing model-based data transformation, in accordance with one or more aspects of the present disclosure. Method 600 and/or each of its individual functions, routines, subroutines, or operations may be performed by one or more general purpose and/or specialized processing devices. Two or more functions, routines, subroutines, or operations of method 600 may be performed in parallel or in an order that may differ from the order described above. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. In an illustrative example, a computer system implementing method 600 may include one or more example computer systems 700 of FIG. 7. Method 600 may be implemented in the batch and/or interactive mode.

At block 610, the computer system implementing the method may receive a source graph model describing a source data structure. The source graph model may include a root node associated with a plurality of section nodes, and each section node may be associated with at least one attribute node, as described in more detail herein above. In various illustrative examples, the source graph model may be received as a file, as a data stream (e.g., via an inter-process communication mechanism such as a socket), or as a memory data structure, the pointer to which is received via an application programming interface (API) call. In some implementations, at least part of the source graph model may be received via a graphical user interface (GUI).

At block 620, the computer system may receive a target graph model describing a target data structure. The target graph model may include a root node associated with a plurality of section nodes, and each section node may be associated with at least one attribute node, as described in more detail herein above. In various illustrative examples, the target graph model may be received as a file, as a data stream (e.g., via an inter-process communication mechanism such as a socket), or as a memory data structure, the pointer to which is received via an API call. In some implementations, at least part of the target graph model may be received via a GUI.

At block 630, the computer system may receive a transformation map that associates, directly or via a transformation node, each attribute node of the target data structure with one or more attribute nodes of the source data structure, as described in more detail herein above. In various illustrative examples, the transformation map may be received as a file, as a data stream (e.g., via an inter-process communication mechanism such as a socket), or as a memory data structure, the pointer to which is received via an API call. In some implementations, at least part of the transformation map may be received via a GUI.

At block 640, the computer system may initialize the attribute node index in the target data structure, in order to iterate over the target data structure attributes.

At block 650, the computer system may identify one or more source attribute nodes that are associated, directly or via a transformation node, with the target attribute identified by the attribute node index.

At block 660, the computer system may extract, from the source data structure, one or more source data items associated with the identified source attribute nodes.

At block 670, the computer system may apply a transformation specified by the transformation map to the extracted source data items, in order to generate the value of the target attribute node, as described in more detail herein above.

At block 680, the computer system may store the value of the target attribute node in the target data structure.

At block 690, the computer system may increment the value of the attribute index in the target data structure.

Responsive to determining, at block 695, that the list of attributes of the target data structure has not yet been exhausted, the method may loop back to block 650; otherwise, the method may terminate. In various illustrative examples, the target data structure may be stored in a file, transmitted as a data stream (e.g., via an inter-process communication mechanism such as a socket), or stored in a memory data structure, the pointer to which is returned via an API call. In some implementations, at least part of the target data structure may be rendered via a GUI.

FIG. 7 illustrates a diagrammatic representation of a computer system 700, which may be employed for implementing the methods described herein. The computer system 700 may be connected to other computing devices in a LAN, an intranet, an extranet, and/or the Internet. The computer system 700 may operate in the capacity of a server machine in a client-server network environment. The computer system 700 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 700 may implement the above-described method 600 of model-based data transformation.

The example computer system 700 may include a processing device 702, a main memory 704 (e.g., synchronous dynamic random access memory (DRAM), read-only memory (ROM)), and a static memory 707 (e.g., flash memory and a data storage device 718), which may communicate with each other via a bus 730.

The processing device 702 may be provided by one or more general-purpose processing devices such as a microprocessor, central processing unit, or the like. In an illustrative example, the processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also comprise one or more special-purpose processing devices such as an application specific integrated circuit (ASIC), a field programmable gate array (FPGA), a digital signal processor (DSP), a network processor, or the like. The processing device 702 may be configured to execute the method 600 of model-based data transformation, in accordance with one or more aspects of the present disclosure.

The computer system 700 may further include a network interface device 708, which may communicate with a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and/or an acoustic signal generation device 717 (e.g., a speaker). In one embodiment, video display unit 710, alphanumeric input device 712, and cursor control device 717 may be combined into a single component or device (e.g., an LCD touch screen).

The data storage device 718 may include a computer-readable storage medium 728, on which may be stored one or more sets of instructions (e.g., instructions of the method 600 of model-based data transformation, in accordance with one or more aspects of the present disclosure) implementing any one or more of the methods or functions described herein. The instructions may also reside, completely or at least partially, within main memory 704 and/or within processing device 702 during execution thereof by computer system 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" shall be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "identifying," "determining," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices.

Examples described herein also relate to an apparatus for performing the methods and systems described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   receiving, by a computer system, a source model describing a source data structure, wherein the source model references a plurality of source section nodes, wherein each source section node of the plurality of source section nodes is associated with at least one source attribute node of a plurality of source attribute nodes, wherein each source attribute node of the plurality of source attribute nodes is associated with a respective property specifying a position of a corresponding source data item in the source data structure;
   receiving a target model describing a target data structure, wherein the target model references a plurality of target section nodes, wherein each target section node of the plurality of target section nodes is associated with at least one target attribute node; and
   generating, by applying a specified transformation to one or more source data items associated with the at least one source attribute node, a target data item associated with the at least one target attribute node.

2. The method of claim 1, wherein the target data structure is one of: a data file, a memory data structure, or a data stream.

3. The method of claim 1, further comprising:
   utilizing the target data structure for performing a business process.

4. The method of claim 1, wherein the transformation is specified by an executable script.

5. The method of claim 1, wherein each source attribute node is associated with a property specifying an index of a corresponding source data item in the source data structure.

6. The method of claim 1, wherein the transformation is specified by a transformation map associating a target attribute node of the target data structure with one or more source attribute nodes of the source data structure.

7. A system, comprising:
   a memory; and
   a processing device operatively coupled to the memory, wherein the processing device is configured to:
      receive a source model describing a source data structure, wherein the source model references a plurality of source section nodes, wherein each source section node of the plurality of source section nodes is associated with at least one source attribute node of a plurality of source attribute nodes, wherein each source attribute node of the plurality of source attribute nodes is associated with a respective property specifying a position of a corresponding source data item in the source data structure;
      receive a target model describing a target data structure, wherein the target model references a plurality of target section nodes, wherein each target section node of the plurality of target section nodes is associated with at least one target attribute node; and
      generate, by applying a specified transformation to one or more source data items associated with the at least one source attribute node, a target data item associated with the at least one target attribute node.

8. The system of claim 7, wherein the target data structure is one of: a data file, a memory data structure, or a data stream.

9. The system of claim 7, further comprising:
   utilizing the target data structure for performing a business process.

10. The system of claim 7, wherein the transformation is specified by an executable script.

11. The system of claim 7, wherein each source attribute node is associated with a property specifying a position of a corresponding source data item in the source data structure.

12. The system of claim 7, wherein the transformation is specified by a transformation map associating a target attribute node of the target data structure with one or more source attribute nodes of the source data structure.

13. A non-transitory computer-readable storage medium comprising executable instructions which, when executed by a computer system, cause the computer system to:
   receive a source model describing a source data structure, wherein the source model references a plurality of source section nodes, wherein each source section node of the plurality of source section nodes is associated with at least one source attribute node of a plurality of source attribute nodes, wherein each source attribute node of the plurality of source attribute nodes is associated with a respective property specifying a position of a corresponding source data item in the source data structure;
   receive a target model describing a target data structure, wherein the target model references a plurality of target section nodes, wherein each target section node of the plurality of target section nodes is associated with at least one target attribute node; and generate, by applying a specified transformation to one or more source data items associated with the at least one source attribute node, a target data item associated with the at least one target attribute node.

14. The non-transitory computer-readable storage medium of claim 13, wherein the target data structure is one of: a data file, a memory data structure, or a data stream.

15. The non-transitory computer-readable storage medium of claim 13, further comprising executable instructions which, when executed by the computer system, cause the computer system to:
utilize the target data structure for performing a business process.

16. The non-transitory computer-readable storage medium of claim 13, wherein each source attribute node is associated with a property specifying an index of a corresponding source data item in the source data structure.

17. The non-transitory computer-readable storage medium of claim 13, wherein the transformation is specified by a transformation map associating a target attribute node of the target data structure with one or more source attribute nodes of the source data structure.

\* \* \* \* \*